(12) United States Patent
Kobayashi et al.

(10) Patent No.: US 11,060,587 B1
(45) Date of Patent: Jul. 13, 2021

(54) VARIABLE-SPEED SPEED-UP MECHANISM

(71) Applicant: MITSUBISHI HEAVY INDUSTRIES COMPRESSOR CORPORATION, Tokyo (JP)

(72) Inventors: Masahiro Kobayashi, Hiroshima (JP); Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 562 days.

(21) Appl. No.: 16/076,134

(22) PCT Filed: May 12, 2016

(86) PCT No.: PCT/JP2016/064134
§ 371 (c)(1),
(2) Date: Aug. 7, 2018

(87) PCT Pub. No.: WO2017/095321
PCT Pub. Date: Nov. 16, 2017

(51) Int. Cl.
*F16H 61/12* (2010.01)
*F16H 3/72* (2006.01)
*F16H 57/10* (2006.01)

(52) U.S. Cl.
CPC ............ *F16H 3/724* (2013.01); *F16H 57/10* (2013.01); *F16H 61/12* (2013.01);
(Continued)

(58) Field of Classification Search
CPC .......... F16H 3/724; F16H 57/10; F16H 61/12; F16H 2061/1256; F16H 2061/1292; F16H 2061/1296
See application file for complete search history.

(56) References Cited

U.S. PATENT DOCUMENTS 3,056,914 A * 10/1962 Potter .................... H02K 51/00
322/40
6,106,426 A    8/2000 Morhard et al.
(Continued)

FOREIGN PATENT DOCUMENTS

JP    2000-046147 A    2/2000
JP       4472350 B2    6/2010
(Continued)

OTHER PUBLICATIONS

International Search Report for corresponding International Application No. PCT/JP2016/064134, dated Jul. 5, 2016 (4 pages).
(Continued)

*Primary Examiner* — Justin Holmes
(74) *Attorney, Agent, or Firm* — Osha Bergman Watanabe & Burton LLP

(57) ABSTRACT

A variable-speed speed-up mechanism (1) includes an electric device (50) and a transmission device (10). In the transmission (10), an internal gear carrier shaft (37) forms a constant-speed input shaft (Ac), and a planetary gear carrier shaft (27) forms a variable-speed input shaft (Av). The electric device (50) includes a constant-speed electric motor (51) having a constant-speed rotor (52) which is configured to rotate the constant-speed input shaft (Ac), and a variable-speed electric motor (71) having a variable-speed rotor (72) which is connected to the variable-speed input shaft (Ac). The variable-speed speed-up mechanism (1) further includes a brake mechanism (200) which is configured to detect an abnormal state of the variable-speed electric motor (71), stop the rotation of at least one of the variable-speed input shaft (Ac) and the variable-speed rotor (72), and continue the rotation of the constant-speed rotor (52).

6 Claims, 7 Drawing Sheets

(52) U.S. Cl.
CPC ............... *F16H 2061/1256* (2013.01); *F16H 2061/1292* (2013.01); *F16H 2061/1296* (2013.01)

(56) References Cited

U.S. PATENT DOCUMENTS

| | | |
|---|---|---|
| 2005/0113201 A1 | 5/2005 | Kimura et al. |
| 2012/0133155 A1* | 5/2012 | Sorg .................. F03D 9/25 290/1 C |
| 2017/0141706 A1 | 5/2017 | Kobayashi et al. |
| 2018/0195582 A1* | 7/2018 | Han ................... F03B 13/22 |

FOREIGN PATENT DOCUMENTS

| | | |
|---|---|---|
| JP | 2014-159762 A | 9/2014 |
| WO | 2016/010146 A1 | 1/2016 |

OTHER PUBLICATIONS

Written Opinion for corresponding International Application No. PCT/JP2016/064134, dated Jul. 5, 2016 (7 pages).

\* cited by examiner

AXIAL DIRECTION
INPUT SIDE ⟷ OUTPUT SIDE

VARIABLE-SPEED SPEED-UP MECHANISM

TECHNICAL FIELD

The present invention relates to a variable-speed speed-up mechanism.

BACKGROUND ART

As a device which drives a rotary machine, such as a compressor, there are a variable-speed speed-up mechanism equipped with an electric device which generates a rotational driving force and a transmission device which changes the rotational driving force generated by the electric device and transmits the rotational driving force to the rotary machine.

Patent Document 1 describes that a constant-speed electric motor and a variable-speed electric motor for speed change are used as the electric device and a planetary gear transmission device is used as the transmission device in order to accurately control the gear ratio. In the device, by changing the rotational speed of the variable-speed electric motor, it is possible to change the rotational speed of the output shaft of the transmission device connected to the rotary machine.

CITATION LIST

Patent Literature

[Patent Document 1] Japanese Patent No. 4472350

In the above-described device, in a case of any abnormality, the rotational speed of the constant-speed electric motor and the rotary machine which is a target to be driven spontaneously decreases due to power shutdown. Meanwhile, in the variable-speed electric motor, there is a case where the rotational speed is determined by the rotational speed of the constant-speed electric motor or the inertia of the rotary machine. Accordingly, there is a problem that the rotational speed of a variable-speed rotor of the variable-speed electric motor becomes greater than the rated rotational speed.

The present invention provides a variable-speed speed-up mechanism which is capable of suppressing the rotational speed of the variable-speed rotor from becoming greater than the rated rotational speed.

SUMMARY OF INVENTION

Technical Problem

According to a first aspect of the present invention, there is provided a variable-speed speed-up mechanism including: an electric device which is configured to generate a rotational driving force; and a transmission device which is configured to change the rotational driving force generated by the electric device and transmits the rotational driving force to a target to be driven, in which the transmission device includes a sun gear which is configured to rotate around an axis line, a sun gear shaft which is fixed to the sun gear and extends in a axial direction around the axis line, a planetary gear which is configured to mesh with the sun gear and revolve around the axis line and rotate around a center line thereof, an internal gear of which a plurality of teeth are arranged in an annular shape around the axis line, and which is configured to mesh with the planetary gear, a planetary gear carrier which has a planetary gear carrier shaft that extends in the axial direction around the axis line and supports the planetary gear to be capable of revolving around the axis line and to be rotatable around the center line of the planetary gear itself, and an internal gear carrier which has an internal gear carrier shaft that extends in the axial direction around the axis line and supports the internal gear to be rotatable around the axis line, in which the sun gear shaft forms an output shaft which is configured to connect to the target to be driven, the internal gear carrier shaft forms a constant-speed input shaft, and the planetary gear carrier shaft forms a variable-speed input shaft, in which the electric device includes a constant-speed electric motor having a constant-speed rotor that is configured to rotate the constant-speed input shaft of the transmission device in a first direction, and a variable-speed electric motor having a variable-speed rotor which is connected to the variable-speed input shaft of the transmission device, which is formed in a cylindrical shape around the axis line, and in which the constant-speed input shaft is inserted into a shaft insertion hole penetrating in the axial direction, and in which a brake mechanism which is configured to detect an abnormal state of the variable-speed electric motor, stops rotation of at least one of the variable-speed input shaft and the variable-speed rotor, and continues the rotation of the constant-speed rotor, is further provided.

With the configuration, it is possible to stop the variable-speed input shaft or the variable-speed rotor according to the abnormal state of the variable-speed electric motor. Accordingly, it is possible to stop only the variable-speed electric motor without depending on the operation state of the constant-speed electric motor.

In the variable-speed speed-up mechanism according to a second aspect of the present invention, in the first aspect, the brake mechanism may include a detection unit which is configured to detect a state of the variable-speed electric motor, a brake unit which is configured to stop the rotation of at least one of the variable-speed input shaft and the variable-speed rotor, and a brake control unit which is configured to send an instruction to stop the rotation of at least one of the variable-speed input shaft and the variable-speed rotor to the brake unit in a case where a detection result of the detection unit is regarded to be in an abnormal state.

With the configuration, it is possible to stop the rotation of the variable-speed input shaft or variable-speed rotor without hindering the rotation of the constant-speed rotor by the brake unit. Accordingly, it is possible to suppress the overspeed of the variable-speed input shaft or the variable-speed rotor without affecting the operation state of the constant-speed electric motor.

In the variable-speed speed-up mechanism according to a third aspect of the present invention, in the second aspect, the detection unit may measure a rotational speed of the variable-speed rotor, and the brake control unit may regard the detection result to be in the abnormal state in a case where the rotational speed measured by the detection unit exceeds a reference value and, may send an instruction to the brake unit.

With the configuration, it is possible to monitor whether or not abnormality occurs in the rotation of the variable-speed rotor. Therefore, it is possible to more effectively suppress the overspeed of the variable-speed rotor that causes abnormality in the rotational speed.

In the variable-speed speed-up mechanism according to a fourth aspect of the present invention, in the second or third aspect, the detection unit may measure a temperature of a bearing which supports the variable-speed rotor, and the brake control unit may regard the detection result to be in the abnormal state in a case where the temperature measured by the detection unit exceeds a reference value, and may send an instruction to the brake unit.

With the configuration, it is possible to monitor whether or not the temperature of the bearing is extremely high. Therefore, in a case where the abnormality, such as an increase in temperature of the bearing, is generated in the variable-speed rotor, it is possible to more effectively suppress the overspeed.

In the variable-speed speed-up mechanism according to a fifth aspect of the present invention, in any one of the second to fourth aspects, the detection unit may measure a vibration frequency of the variable-speed rotor, and the brake control unit may regard the detection result to be in the abnormal state in a case where the vibration frequency measured by the detection unit exceeds a reference value, and may send an instruction to the brake unit.

With the configuration, it is possible to monitor whether or not the variable-speed rotor largely vibrates. Therefore, in a case where the abnormality, such as a large vibration of the variable-speed rotor, is generated, it is possible to more effectively suppress the overspeed.

In the variable-speed speed-up mechanism according to a sixth aspect of the present invention, in any one of the second to fifth aspects, the detection unit may detect a state of a rotational speed control device which controls the rotational speed of the variable-speed rotor, and the brake control unit may regard the state of the rotational speed control device detected by the detection unit as the abnormal state in a case where the rotational speed control device is regarded to be failed, and may send the instruction to the brake unit.

With the configuration, it is possible to monitor whether or not abnormality, such as a failure in the rotational speed control device, is generated. Therefore, in a case where the abnormality is generated in the variable-speed rotor by the failure of the rotational speed control device, it is possible to more effectively suppress the overspeed.

Advantageous Effects of Invention

According to the present invention, it is possible to prevent the rotational speed of the variable-speed rotor from becoming greater than a rated rotational speed.

DESCRIPTION OF EMBODIMENTS

First Embodiment

Hereinafter, a variable-speed speed-up mechanism 1 of an embodiment of the present invention will be described in detail with reference to the drawings.

Figure 1:
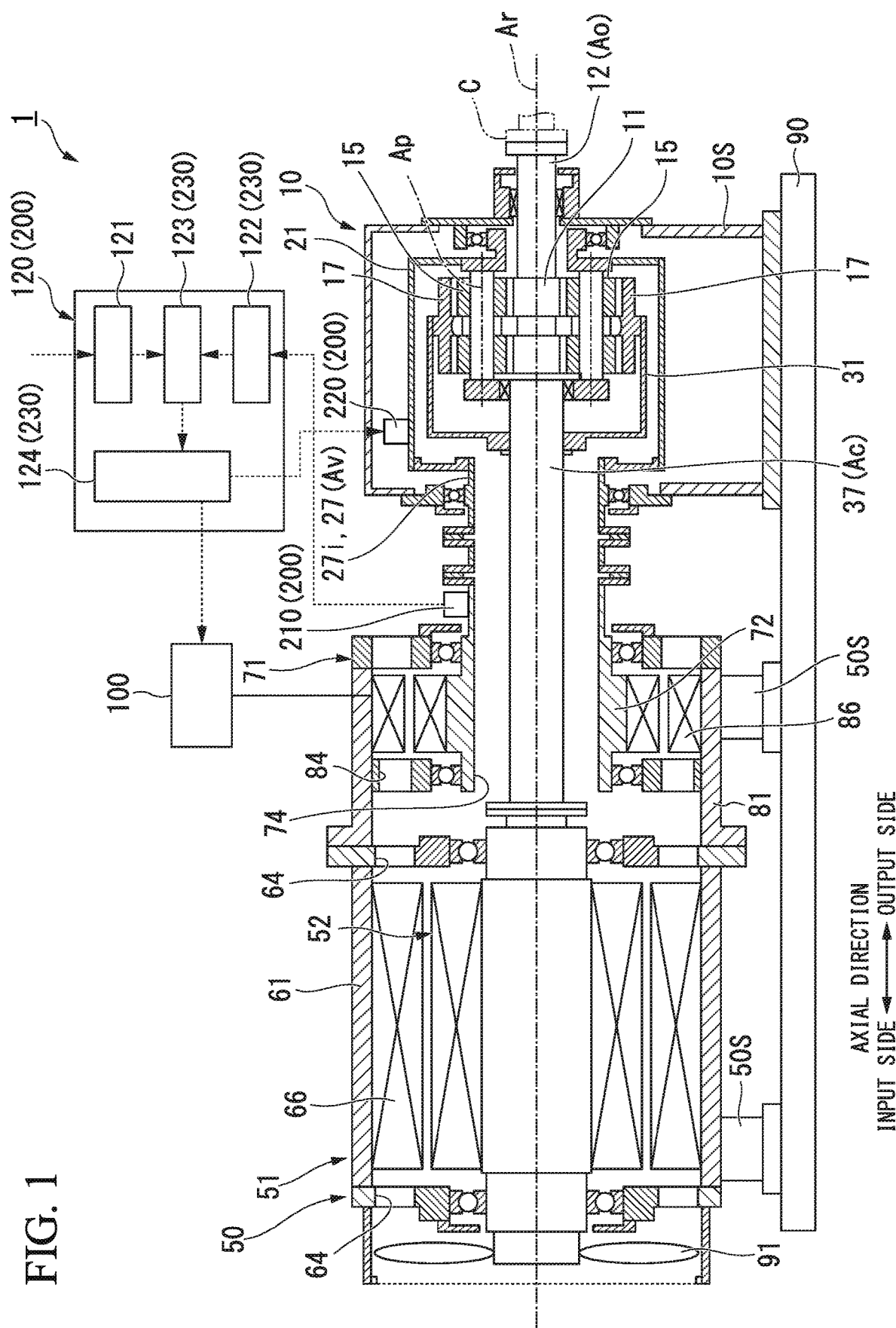
FIG. 1 is a sectional view of a variable-speed speed-up mechanism of a first embodiment according to the present invention.

As described in FIG. 1, the variable-speed speed-up mechanism 1 of the embodiment includes an electric device 50 which generates a rotation driving force, and a transmission device 10 which change the speed of the rotation driving force generated in the electric device 50 and sends the rotation driving force to a target to be driven. The variable-speed speed-up mechanism 1 can be applied to, for example, a fluid mechanical system, such as a compressor system. The variable-speed speed-up mechanism 1 is connected to a compressor C that serves as the target to be driven. The electric device 50 is supported by a frame 90 by an electric device support unit 50S. The transmission device 10 is supported by the frame 90 by a transmission device instruction unit 10S.

Figure 2:
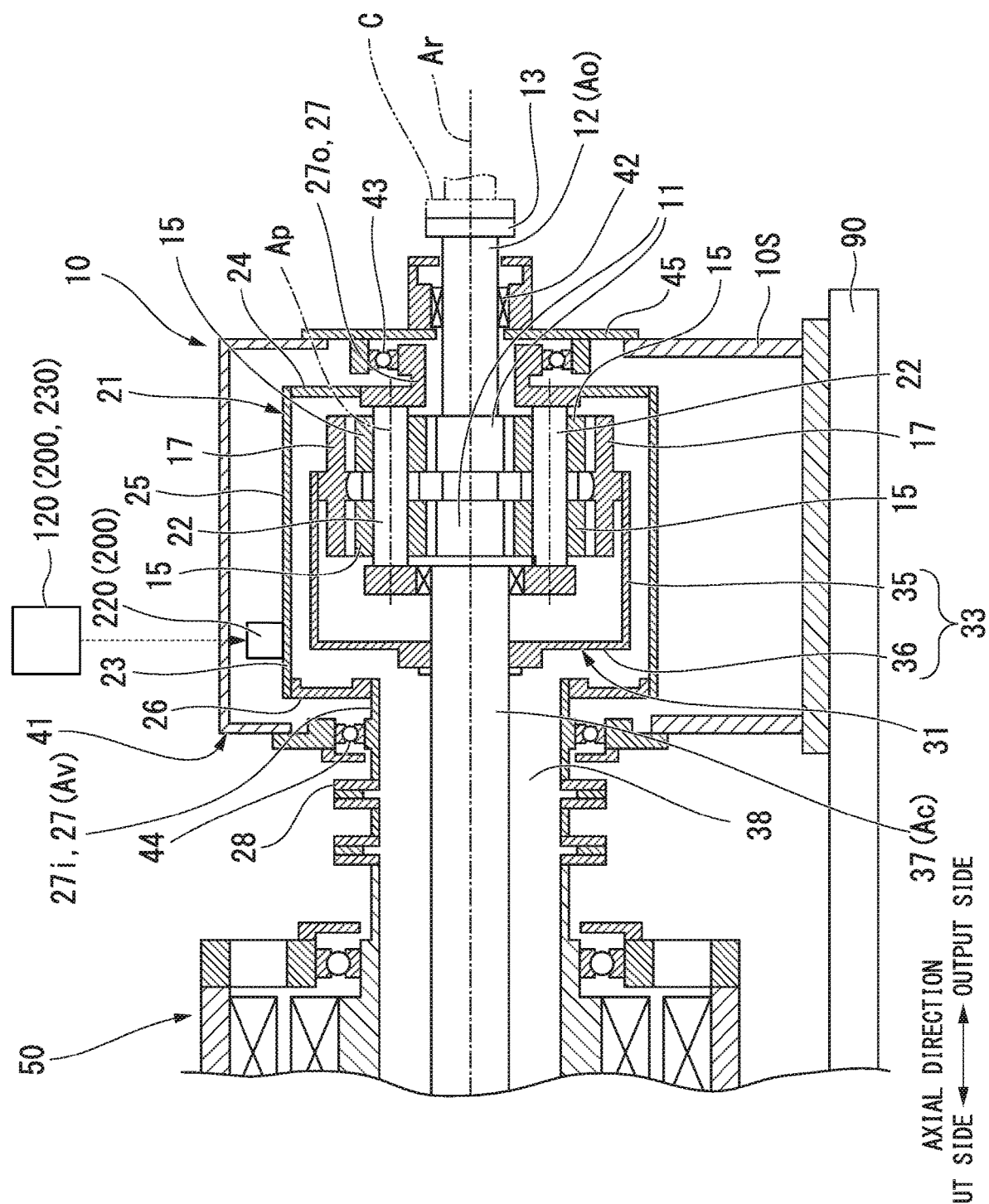
FIG. 2 is a sectional view of a transmission device of the first embodiment according to the present invention.

The transmission device 10 is a planetary gear transmission device. As shown in FIG. 2, the transmission device 10 has a sun gear 11, a plurality of planetary gears 15, an internal gear 17, a planetary gear carrier 21, an internal gear carrier 31, and a transmission casing 41.

The sun gear 11 rotates around an axis Ar that extends in a horizontal direction. The transmission casing 41 covers the sun gear 11, the plurality of planetary gears 15, the internal gear 17, the planetary gear carrier 21, and the internal gear carrier 31.

Hereinafter, a direction in which the axis Ar extends is taken as the axial direction, one side in the axial direction is an output side, and the side opposite to the output side is an input side. In addition, a radial direction around the axis Ar is simply referred to as the radial direction.

The sun gear shaft 12 is fixed to the sun gear 11. The sun gear shaft 12 has a columnar shape around the axis Ar. The sun gear shaft 12 extends from the sun gear 11 to the output side in the axial direction. A connection flange 13 is formed at an output side end portion of the sun gear shaft 12. For example, a rotor of a compressor C that serves as the target to be driven is connected to the connection flange 13. The sun gear shaft 12 is supported by a sun gear bearing 42 disposed on the output side of the sun gear 11 so as to be rotatable around the axis Ar. The sun gear bearing 42 is attached to the output side of an annular casing flange 45 which extends radially outward. The casing flange 45 is attachable to and detachable from the transmission casing 41.

The planetary gear 15 meshes with the sun gear 11. The planetary gear 15 revolves around the axis Ar and also rotates around a center line Ap thereof.

The internal gear 17 meshes with the plurality of planetary gears 15. In the internal gear 17, a plurality of teeth are arranged annularly around the axis Ar.

The planetary gear carrier 21 supports the plurality of planetary gears 15 so as to be capable of revolving around the axis Ar and to be rotatable around the center line Ap of the planetary gear 15 itself. The planetary gear carrier 21 includes a planetary gear shaft 22, a planetary gear carrier body 23, and a planetary gear carrier shaft 27.

The planetary gear shaft 22 is provided for each of the plurality of planetary gears 15. The planetary gear shaft 22 penetrates the center line Ap of the planetary gear 15 in the axial direction and supports the planetary gear 15 so as to be rotatable around the center line Ap as a center.

The planetary gear carrier body 23 fixes mutual positions of the plurality of planetary gear shafts 22. The planetary gear carrier body 23 includes a planetary gear output side arm portion 24, a planetary gear cylinder portion 25, and a planetary gear input side arm portion 26.

The planetary gear output side arm portion 24 extends radially outward from the plurality of planetary gear shafts 22. The planetary gear cylinder portion 25 extends in the axial direction from the radially outer end of the planetary gear output side arm portion 24 to the input side. The plurality of the planetary gear cylinder portions 25 are arranged at intervals so as to form a cylindrical shape around the axis Ar. The planetary gear cylinder portion 25 is attachable to and detachable from the planetary gear output side arm portion 24. The planetary gear input side arm portion 26 extends radially inward from the output side end of the planetary gear cylinder portion 25.

The planetary gear carrier shaft 27 is fixed to the planetary gear carrier body 23. The planetary gear carrier shaft 27 extends in the axial direction around the axis Ar. The planetary gear carrier shaft 27 includes an output side planetary gear carrier shaft 27o which extends from the planetary gear output side arm portion 24 to the output side, and an input side planetary gear carrier shaft 27i which extends from the planetary gear input side arm portion 26 to the input side. Both of the output side planetary gear carrier shaft 27o and the input side planetary gear carrier shaft 27i form a cylindrical shape around the axis Ar.

The output side planetary gear carrier shaft 27o is supported by a first planetary gear carrier bearing 43 disposed further on the output side than the planetary gear output side arm portion 24 so as to be rotatable around the axis Ar. The first planetary gear carrier bearing 43 is attached to the casing flange 45 from the opposite side in the axial direction from the sun gear bearing 42. The sun gear shaft 12 is inserted through the inner circumferential side of the output side planetary gear carrier shaft 27o.

The input side planetary gear carrier shaft 27i is supported by a second planetary gear carrier bearing 44 disposed further on the input side than the planetary gear input side arm portion 26 so as to be rotatable around the axis Ar. The second planetary gear carrier bearing 44 is attached to the transmission casing 41. An annular planetary gear flange 28 which widens radially outward is formed at the input side end of the input side planetary gear carrier shaft 27i.

The internal gear carrier 31 supports the internal gear 17 to be rotatable around the axis Ar. The internal gear carrier 31 includes an internal gear carrier body 33 to which the internal gear 17 is fixed and an internal gear carrier shaft 37 which is fixed to the internal gear carrier body 33 and extends in the axial direction around the axis Ar.

The internal gear carrier body 33 includes an internal gear cylinder portion 35 which is formed in a cylindrical shape around the axis Ar and has the internal gear 17 fixed to the inner circumferential side thereof, and an internal gear input arm portion 36 which extends radially inward from the input side end of the internal gear cylinder portion 35.

The internal gear carrier shaft 37 having a columnar shape around the axis Ar is disposed on the input side of the sun gear shaft 12 having a columnar shape around the axis Ar. The internal gear input side arm portion 36 of the internal gear carrier body 33 is fixed to the internal gear carrier shaft 37. The input side part of the internal gear carrier shaft 37 is inserted into the inner circumferential side of the cylindrical input side planetary gear carrier shaft 27i.

Figure 3:
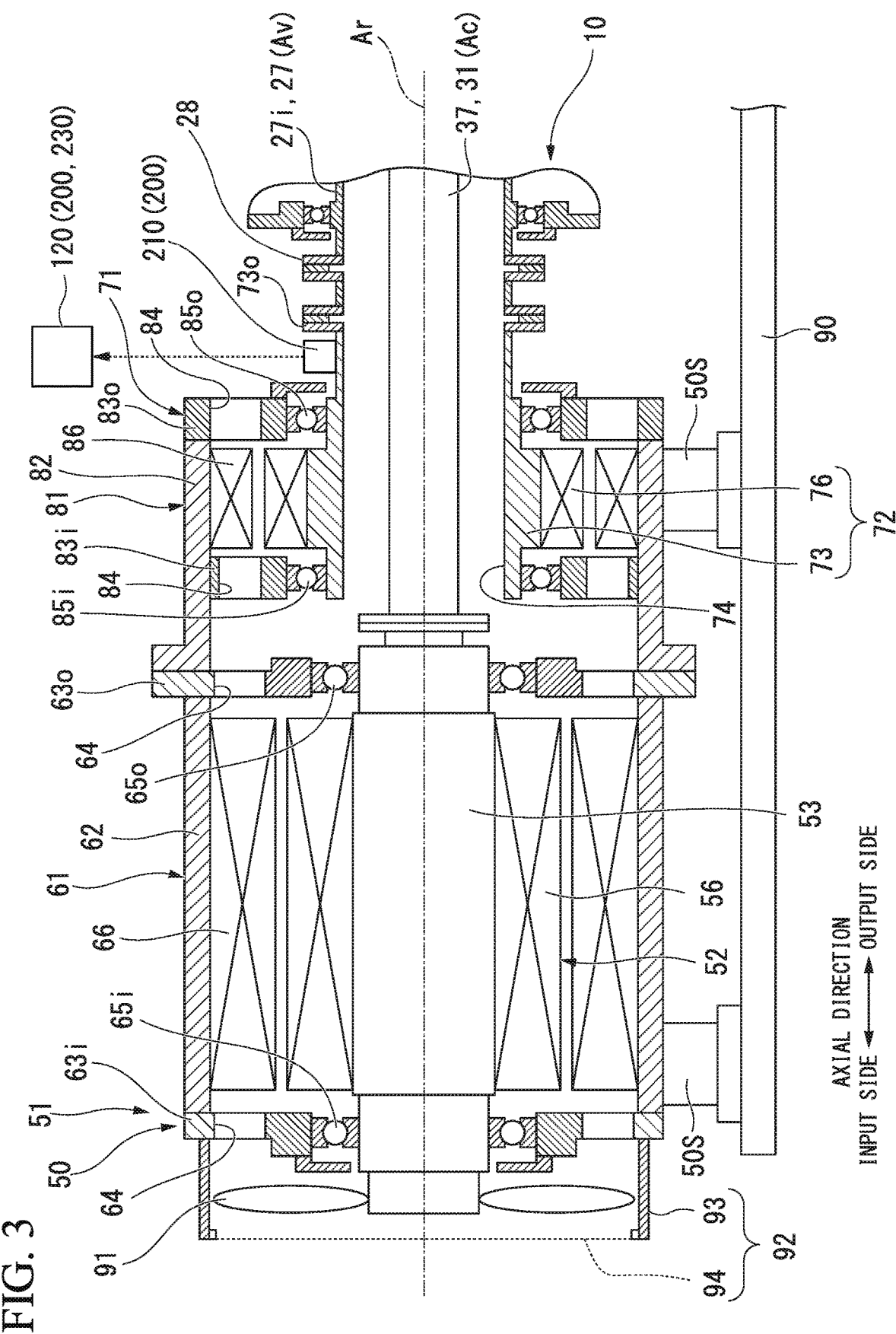
FIG. 3 is a sectional view of an electric device of the first embodiment according to the present invention.

As shown in FIG. 3, the electric device 50 includes a constant-speed electric motor 51 which rotates and drives the internal gear carrier shaft 37 at a constant-speed, and a variable-speed electric motor 71 which rotates and drives the input side planetary gear carrier shaft 27i at any rotational speed.

The internal gear carrier shaft 37 is a constant-speed input shaft Ac which rotates at a constant-speed by a driving force of the constant-speed electric motor 51. The input side planetary gear carrier shaft 27i is a variable-speed input shaft Av which rotates at any rotational speed by a driving force of the variable-speed electric motor 71.

In the variable-speed speed-up mechanism 1, by changing the rotational speed of the variable-speed electric motor 71, it is possible to change the rotational speed of the sun gear shaft 12 which is an output shaft Ao of the transmission device 10 connected to the target to be driven.

The constant-speed electric motor 51 rotates and drives the internal gear carrier shaft 37 of the transmission device 10. The variable-speed electric motor 71 rotates and drives the input side planetary gear carrier shaft 27i of the transmission device 10. The electric device 50 includes a cooling fan 91 for cooling the constant-speed electric motor 51 and a fan cover 92 which covers the cooling fan 91.

In the present embodiment, the constant-speed electric motor 51 is, for example, a four-pole three-phase induction electric motor. In addition, the variable-speed electric motor 71 is a six-pole three-phase induction electric motor having more poles than the constant-speed electric motor 51. In addition, the specifications of the constant-speed electric motor 51 and the variable-speed electric motor 71 are not limited thereto, and specifications can be appropriately changed.

The constant-speed electric motor 51 includes a constant-speed rotor 52, a constant-speed stator 66, and a constant-speed electric motor casing 61. The constant-speed electric motor 51 rotates and drives the constant-speed rotor 52 (internal gear 17) in a first direction R1 (refer to FIG. 4, positive direction) in a circumferential direction of the axis Ar. As the constant-speed rotor 52 rotates in the first direction R1, the internal gear carrier shaft 37 and the internal gear carrier 31 rotate in the first direction R1.

The constant-speed rotor 52 rotates around the axis Ar. The constant-speed rotor 52 is connected to the internal gear carrier shaft 37 which is the constant-speed input shaft Ac of the transmission device 10. The constant-speed rotor 52 includes a constant-speed rotor shaft 53 which forms a column shape around the axis Ar and a conductor 56 which is fixed to the outer circumference of the constant-speed rotor shaft 53. The cooling fan 91 is fixed to the input side end of the constant-speed rotor shaft 53.

The constant-speed stator 66 is disposed on the outer circumferential side of the constant-speed rotor 52. The constant-speed stator 66 is disposed on the radially outside of the conductor 56 of the constant-speed rotor 52. The constant-speed stator 66 is formed of a plurality of coils.

In the constant-speed electric motor casing 61, the constant-speed stator 66 is fixed to the inner circumferential side. The constant-speed electric motor casing 61 includes a constant-speed casing body 62 and lids 63i and 63o. The constant-speed casing body 62 has a cylindrical shape around the axis Ar. In the constant-speed casing body 62, the constant-speed stator 66 is fixed to the inner circumferential side. The lids 63i and 63o block both axial ends of the cylindrical constant-speed casing body 62. Constant-speed rotor bearings 65i and 65o which rotatably support the constant-speed rotor shaft 53 around the axis Ar, are attached to each of the lids 63i and 63o. A plurality of openings 64 which penetrate in the axial direction are formed in each of the lids 63*i* and 63*o* at positions further on the radially outside than the constant-speed rotor bearing 65*i*.

The input side end of the constant-speed rotor shaft 53 protrudes to the input side from the lid 63*i* on the input side of the constant-speed electric motor casing 61. The cooling fan 91 is fixed to the input side end of the constant-speed rotor shaft 53.

When the constant-speed rotor 52 rotates, the cooling fan 91 also rotates integrally with the constant-speed rotor 52. The fan cover 92 includes a cylindrical cover body 93 which is disposed on the outer circumferential side of the cooling fan 91, an air circulating plate 94 which is attached to the opening 64 on an inlet side of the cover body 93 and has a plurality of air holes formed therein. The fan cover 92 is fixed to the lid 63*i* on the input side of the constant-speed electric motor casing 61.

The variable-speed electric motor 71 includes a variable-speed rotor 72, a variable-speed stator 86, and a variable-speed electric motor casing 81. The variable-speed electric motor 71 can rotate and drive the variable-speed rotor 72 (the planetary gear carrier 21) in the first direction R1 in the circumferential direction of the axis Ar and in the second direction R2 (refer to FIG. 4) in the direction opposite to the first direction R1. In other words, the variable-speed electric motor 71 is capable of forward rotation and reverse rotation.

The variable-speed electric motor 71 functions as a generator by rotating the variable-speed rotor 72 in the first direction R1. A state where the variable-speed electric motor 71 functions as a generator is referred to as a generator mode. In other words, the variable-speed rotor 72 of the variable-speed electric motor 71 rotates in the first direction R1 in the generator mode.

The variable-speed electric motor 71 functions as an electric motor by rotating the variable-speed rotor 72 in a second direction R2 opposite to the first direction R1. A state where the variable-speed electric motor 71 functions as an electric motor is referred to as an electric motor mode. In other words, the variable-speed rotor 72 of the variable-speed electric motor 71 rotates in the second direction R2 in the electric motor mode.

As the variable-speed rotor 72 rotates in the first direction R1, the planetary gear carrier shaft 27 and the planetary gear carrier 21 rotate in the first direction R1.

The variable-speed rotor 72 rotates around the axis Ar. The variable-speed rotor 72 is connected to the input side planetary gear carrier shaft 27*i* which is the variable-speed input shaft Av. The variable-speed rotor 72 includes a variable-speed rotor shaft 73 and a conductor 76 which is fixed to the outer circumference of the variable-speed rotor shaft 73. The variable-speed rotor shaft 73 has a cylindrical shape around the axis Ar and has a shaft insertion hole 74 which penetrates in the axial direction. An internal gear carrier shaft 37 which is the constant-speed input shaft Ac is inserted into the shaft insertion hole 74 of the variable-speed rotor shaft 73. An annular variable-speed flange 73*o* which extends radially outward is formed at the output side end of the variable-speed rotor shaft 73.

The variable-speed stator 86 is disposed on the outer circumferential side of the variable-speed rotor 72. The variable-speed stator 86 is disposed on the radially outside of the conductor 76 of the variable-speed rotor 72. The variable-speed stator 86 is formed of a plurality of coils.

In the variable-speed electric motor casing 81, the variable-speed stator 86 is fixed to the inner circumferential side. The variable-speed electric motor casing 81 has a variable-speed casing body 82, an output side lid 83*o*, and an inlet side lid 83*i*. The variable-speed casing body 82 has a cylindrical shape around the axis Ar. In the variable-speed casing body 82, the variable-speed stator 86 is fixed to the inner circumferential side. The output side lid 83*o* blocks the output side end of the cylindrical variable-speed casing body 82. The inlet side lid 83*i* is disposed further on the input side than the variable-speed stator 86 and fixed to the inner circumferential side of the cylindrical variable-speed casing body 82. Variable-speed rotor bearings 85*i* and 85*o* which rotatably support the variable-speed rotor shaft 73 around the axis Ar, are attached to each of the lids 83*i* and 83*o*. A plurality of openings 84 which penetrate in the axial direction are formed in each of the lids 83*i* and 83*o* at positions further on the radially outside than the variable-speed rotor bearings 85*i* and 85*o*.

By the plurality of openings 84 formed in the each of lids 83*i* and 83*o* of the variable-speed electric motor casing 81 and the plurality of openings 64 formed in each of the lids 63*i* and 63*o* of the constant-speed electric motor casing 61, a space in the variable-speed electric motor casing 81 and a space in the constant-speed electric motor casing 61 communicate with each other.

In addition, in the variable-speed speed-up mechanism 1 of the present embodiment, the constant-speed rotor 52, the variable-speed rotor 72, and the sun gear shaft 12 are arranged on the same axis Ar.

As shown in FIG. 1, the variable-speed speed-up mechanism 1 of the present embodiment further includes a rotational speed control device 100, a brake mechanism 200, and a main control device 120.

The rotational speed control device 100 controls the rotational speed of the variable-speed electric motor 71. The rotational speed control device 100 is an inverter that changes the rotational direction of the variable-speed electric motor 71 by changing the frequency of the supplied electric power. The rotational speed control device 100 supplies the power of the frequency instructed from the main control device 120 to the variable-speed electric motor 71. The variable-speed rotor 72 of the variable-speed electric motor 71 rotates at a rotational speed that corresponds to the frequency. In this manner, since the rotational speed of the variable-speed rotor 72 changes, the rotational speed of the planetary gear carrier 21 of the transmission device 10 connected to the variable-speed rotor 72 also changes. As a result, the rotational speed of the output shaft Ao of the transmission device 10 also changes. The rotational speed control device 100 also changes the rotational direction of the variable-speed electric motor 71. In other words, the rotational speed control device 100 can rotate the variable-speed rotor 72 forward and reverse.

The brake mechanism 200 detects an abnormal state of the variable-speed electric motor 71, stops the rotation of at least one of the variable-speed input shaft Av and the variable-speed rotor 72, and continues the rotation of the constant-speed rotor 52. In other words, the brake mechanism 200 stops at least one of the variable-speed input shaft Av and the variable-speed rotor 72 without hindering the rotation of the constant-speed rotor 52. The brake mechanism 200 according to the present embodiment brakes at least one of the variable-speed input shaft Av and the variable-speed rotor 72 when an abnormal state occurs and at the same time stops the operation of the variable-speed electric motor 71. The brake mechanism 200 of the present embodiment includes a detection unit 210, a brake unit 220, and a brake control unit 230.

The detection unit 210 detects an abnormal state of the variable-speed electric motor 71. As shown in FIG. 3, the detection unit 210 of the present embodiment is provided in the variable-speed rotor 72. The detection unit 210 detects the rotational speed of the variable-speed rotor 72. The detection unit 210 sends the detection information on the rotation number which is the detection result, to the brake control unit 230.

The brake unit 220 stops the rotation of at least one of the variable-speed input shaft Av and the variable-speed rotor 72. The brake unit 220 of the present embodiment stops the rotation of the variable-speed input shaft Av. As shown in FIG. 2, the brake unit 220 is provided in the planetary gear carrier body 23. Specifically, the brake portion 220 is provided in the planetary gear cylinder portion 25 on the inside of the transmission casing 41. The brake unit 220 restrains the rotation of the planetary gear carrier body 23, thereby restraining the rotation of the input side planetary gear carrier shaft 27i fixed to the planetary gear input side arm unit 26. Accordingly, the brake unit 220 stops the rotation of the planetary gear carrier shaft 27 which is the variable-speed input shaft Av. The brake unit 220 is, for example, a brake disk which clamps and fixes a flange provided on the planetary gear cylinder portion 25.

As shown in FIG. 1, the brake control unit 230 sends an instruction to the brake unit 220 to stop the rotation of at least one of the variable-speed input shaft Av and the variable-speed rotor 72 based on the detection result of the detection unit 210. In a case where the detection result satisfies the predetermined criteria, the brake control unit 230 of the embodiment regards the detection result to be in an abnormal state and sends an instruction to the brake unit 220 to stop the rotation of the variable-speed rotor 72. The brake control unit 230 sends an instruction to the rotational speed control device 100 to stop the supply of electric power to the variable-speed electric motor 71 in a case where the detection result is regarded to be in an abnormal state. In a case where the rotational speed measured by the detection unit 210 exceeds the reference value, the brake control unit 230 regards the detection result to be in an abnormal state and sends an instruction to the brake unit 220. The brake control unit 230 is configured as a part of the main control device 120 which will be described later.

The main control device 120 controls the operation of the rotational speed control device 100 and the brake mechanism 200. The main control device 120 is configured with a computer. The main control device 120 of the present embodiment controls the operation of the rotation number control device 100 and controls the operation of the brake unit 220 as a part of the brake mechanism 200. The main control device 120 includes a first reception unit 121, a second reception unit 122, a calculation unit 123, and an interface 124.

The first reception unit 121 directly receives an instruction from an operator or receives an instruction from an upper level control device. The first reception unit 121 sends the input instruction information to the operation unit 123.

In the second reception unit 122, detection information is input from the detection unit 210. The second reception unit 122 sends the input detection information to the operation unit 123.

The operation unit 123 creates an instruction to change the frequency to the rotation number control device 100 according to the instruction information received by the first reception unit 121. The operation unit 123 determines whether or not the detection information input to the second reception unit 122 exceeds a predetermined reference value, and creates an instruction to the brake unit 220. Here, the reference value is a value that can be regarded as a value that causes an abnormal state of the variable-speed electric motor 71. The reference value of a first embodiment is a value that is greater than the rated rotation number of the variable-speed rotor 72 and is a value that corresponds to the rotational speed that can be regarded as being over-rotated.

In a case where the detection information exceeds a predetermined reference value, the operation unit 123 creates an instruction to restrain the rotation of the planetary gear carrier body 23 with respect to the brake unit 220. The operation unit 123 outputs the created instruction information to the interface 124.

The interface 124 gives an instruction to the rotational speed control device 100 or the brake unit 220 based on the instruction information input from the operation unit 123. Therefore, the brake control unit 230 of the present embodiment is configured with the second reception unit 122 of the main control device 120, the operation unit 123, and the interface 124.

Figure 4:
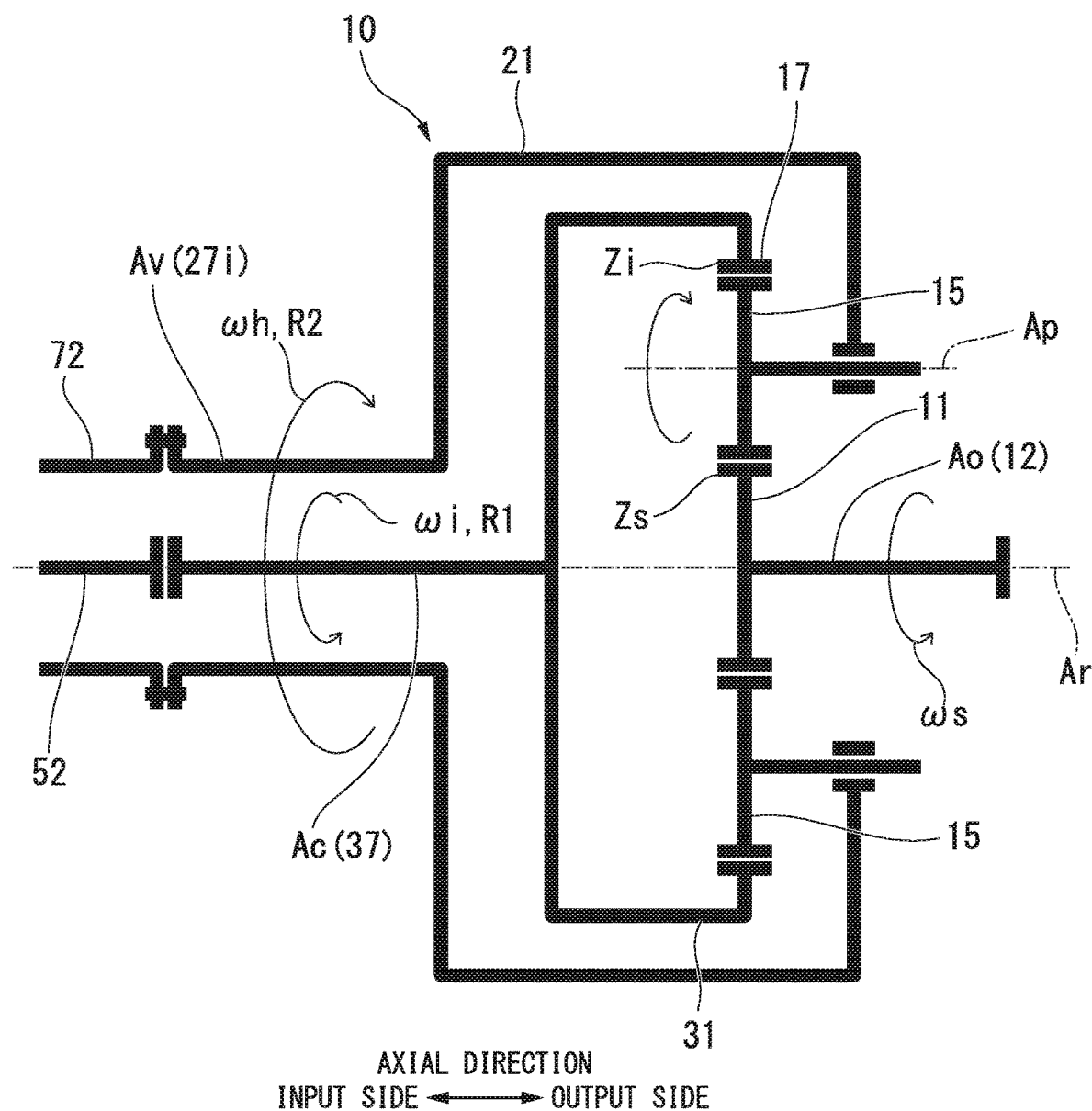
FIG. 4 is a schematic view showing a configuration of the transmission device according to the embodiment of the present invention.

Here, the relationship between the number of teeth of each gear of the transmission device 10 and the rotation number of each shaft of the transmission device 10 will be described with reference to FIG. 4.

The rotational speed of the sun gear shaft 12 that serves as the output shaft Ao is ωs, the rotational speed of the internal gear carrier shaft 37 that serves as the constant-speed input shaft Ac is ωi, and the rotational speed of the input side planetary gear carrier shaft 27i that serves as the variable-speed input shaft Av is ωh. In addition, the number of teeth of the sun gear 11 is Zs, and the number of teeth of the internal gear 17 is Zi.

In this case, the relationship between the number of teeth of each gear and the rotational speed of each shaft of the transmission device 10 can be expressed by the following expression (1).

$$\omega s/\omega i = \omega h/\omega i - (1-\omega h/\omega i) \times Zi/Zs \qquad (1)$$

In a case where the constant-speed electric motor 51 is a four-pole induction electric motor and the power supply frequency is 50 Hz, the rotational speed ωi (rated rotational speed) of the constant-speed rotor 52 (constant-speed input shaft Ac) is 1500 rpm. In addition, in a case where the variable-speed electric motor 71 is a six-pole induction electric motor and the power supply frequency is 50 Hz, the highest rotational speed ωh (rated rotational speed) of the variable-speed rotor 72 (variable-speed input shaft Av) is 900 rpm. Further, if a ratio Zi/Zs between the number of teeth Zs of the sun gear 11 and the number of teeth Zi of the internal gear 17 are assumed to be 4.

In this case, when the direction of rotation of the constant-speed rotor 52 (internal gear 17) is defined as forward rotation (rotation in the first direction R1) and the direction of rotation of the variable-speed rotor 72 (planetary gear carrier 21) is the highest rotational speed (−900 rpm) in a direction (rotation in the second direction R2) reverse to the rotation of the constant-speed rotor 52, the rotational speed ωs of the sun gear shaft 12 which is the output shaft Ao is −10500 rpm. The rotational speed (−10500 rpm) is the highest rotational speed of the sun gear shaft 12.

In other words, in the transmission device 10 of the present embodiment, the internal gear 17 that corresponds to the constant-speed input shaft Ac is forwardly rotated at +1500 rpm and the planetary gear carrier 21 that corresponds to the variable-speed input shaft Av is reversely rotated at −900 rpm, the rotational speed ωs of the output shaft Ao becomes the highest rotational speed.

When assuming that the variable-speed range of the variable-speed input shaft Av is from −900 rpm to +900 rpm, as the rotational speed of the variable-speed input shaft Av approaches +900 rpm, the rotational speed ωs of the output shaft Ao is low.

When the direction of rotation of the constant-speed rotor 52 is set to the forward rotation and the direction of rotation of the variable-speed rotor 72 is the minimum rotation number (−90 rpm) in a direction reverse to the rotation of the constant-speed rotor 52, the rotational speed of the sun gear shaft 12 is −6450 rpm.

In a case where the rotational speed of the constant-speed rotor 52 (rated rotational speed) is +1500 rpm and the rotational speed of the variable-speed rotor 72 in the electric motor mode is controlled within the range of −300 to −900 rpm by frequency control by the rotational speed control device 100, in other words, in a case where the frequency of the electric power to be supplied to the variable-speed electric motor 71 is controlled within the range of 16.7 Hz to 50 Hz, the rotational speed of the sun gear shaft 12 which is the output shaft Ao can be controlled to the range of −7500 to −10500 rpm. The range is a variable-speed range of the sun gear shaft 12 which is the output shaft Ao of the variable-speed speed-up mechanism 1, and the variable-speed speed-up mechanism 1 normally rotates the output shaft Ao within the variable-speed range.

According to the variable-speed speed-up mechanism 1 as described above, in a case where the detection result of the detection unit 210 exceeds the reference value, an instruction from the operation unit 123 is sent to the brake unit 220 via the interface 124. In addition, in such a case, an instruction to stop the supply of electric power to the variable-speed electric motor 71 to the rotational speed control device 100 is sent via the interface 124. As a result, the variable-speed electric motor 71 is urgently stopped, and the rotation of the planetary gear cylinder portion 25 can be stopped by the brake portion 220. By stopping the rotation of the planetary gear cylinder portion 25, the rotation of the planetary gear carrier body 23 is restrained, and the rotation of the input side planetary gear carrier shaft 27i fixed to the planetary gear input side arm portion 26 is restrained. Therefore, it is possible to stop the variable-speed input shaft Av and the variable-speed rotor 72 according to the abnormal state of the variable-speed electric motor 71. Accordingly, it is possible to stop only the variable-speed electric motor 71 without depending on the operation state of the constant-speed electric motor 51. As a result, it is possible to prevent the rotational speed of the variable-speed rotor 72 from becoming greater than a rated rotational speed.

In addition, by stopping only the rotation of the planetary gear cylinder portion 25 by the brake portion 220, the rotation of the internal gear carrier shaft 37 to which the constant-speed rotor 52 is connected is not hindered, and the rotation of the input side planetary gear carrier shaft 27i which is the connected to the variable-speed rotor 72 can be stopped. Accordingly, it is possible to suppress the overspeed of the variable-speed rotor 72 without affecting the operation state of the constant-speed electric motor 51.

In addition, the detection unit 210 detects the rotational speed of the variable-speed rotor 72, and the operation unit 123 determines whether or not the detection result exceeds the reference value. Accordingly, it is possible to monitor whether or not abnormality occurs in the rotation of the variable-speed rotor 72. Therefore, it is possible to more effectively suppress the overspeed of the variable-speed rotor 72 that causes abnormality in the rotational speed.

Second Embodiment

Next, with reference to FIG. 5, a variable-speed speed-up mechanism 1A of a second embodiment will be described.

In the second embodiment, the same configuration elements as those of the first embodiment are denoted by the same reference numerals, and the detailed description thereof will be omitted. The variable-speed speed-up mechanism 1A according to the second embodiment is different from the first embodiment in the configurations of a detection unit 210A and a brake unit 220A.

Figure 5:
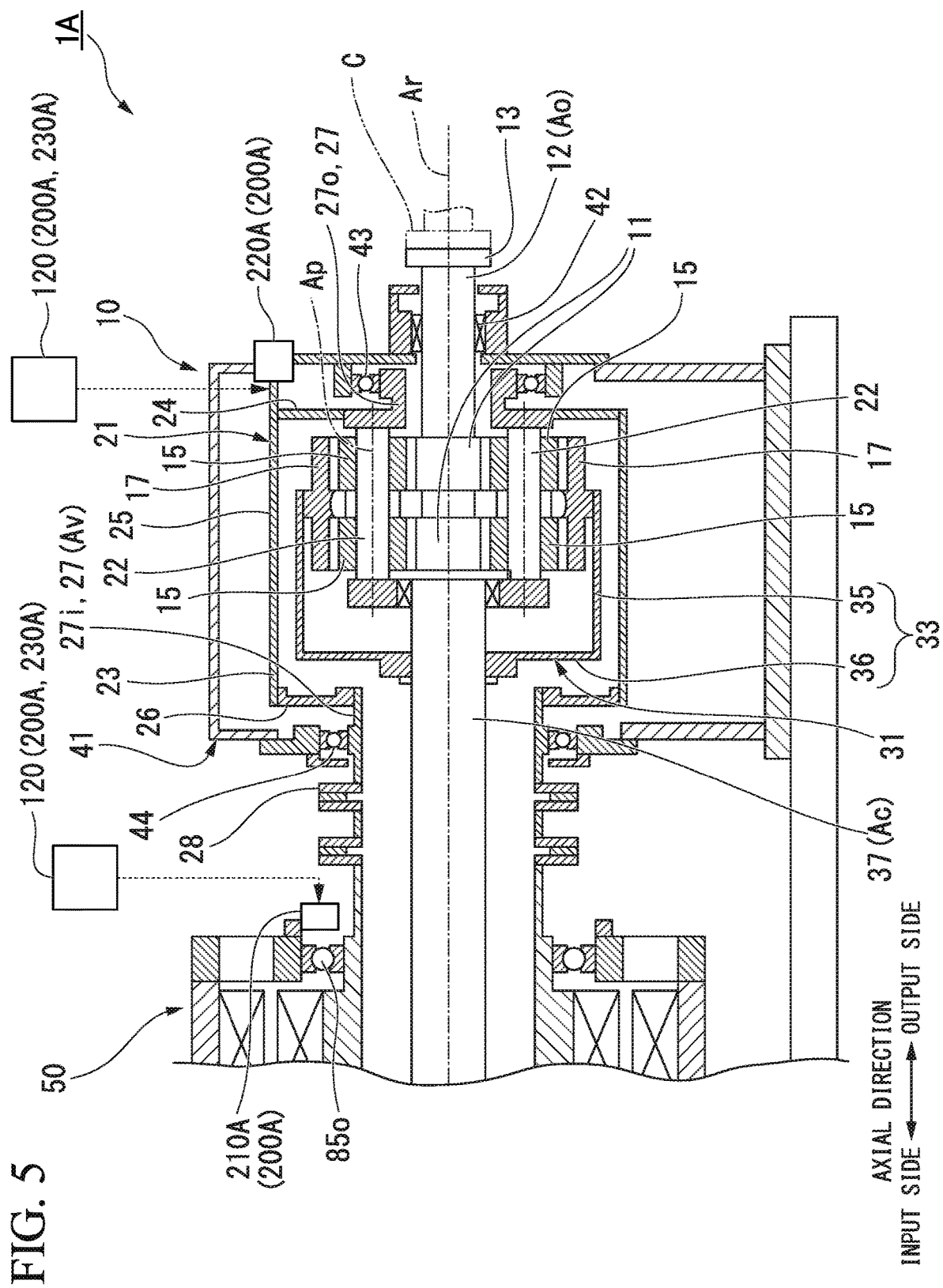
FIG. 5 is a sectional view of a part of a transmission device and an electric device of a second embodiment according to the present invention.

In other words, in the variable-speed speed-up mechanism 1A of the second embodiment, as shown in FIG. 5, the configuration of a brake mechanism 200A is partially different from that of the first embodiment. The brake mechanism 200A of the second embodiment detects an abnormal state of the variable-speed electric motor 71, stops the rotation of the variable-speed input shaft Av, and continues the rotation of the constant-speed rotor 52. In other words, the brake mechanism 200A stops only the variable-speed input shaft Av without hindering the rotation of the constant-speed rotor 52. The brake mechanism 200A of the second embodiment includes the detection unit 210A, the brake unit 220A, and a brake control unit 230A.

The detection unit 210A of the second embodiment is provided at a position at which the variable-speed rotor bearing 85o can be monitored. The detection unit 210A detects the temperature of the variable-speed rotor bearing 85o. The detection unit 210A sends the detection information on the temperature of the variable-speed rotor bearing 85o which is the detection result, to the brake control unit 230A.

The brake unit 220A of the second embodiment stops the rotation of the variable-speed input shaft Av. The brake portion 220A is provided at the end portion on the output side of the planetary gear cylinder portion 25 at a position visible from the outside. The brake unit 220A stops the rotation of the planetary gear carrier body 23 via the planetary gear cylinder portion 25. The brake unit 220A restrains the rotation of the planetary gear carrier body 23, thereby restraining the rotation of the input side planetary gear carrier shaft 27i fixed to the planetary gear input side arm unit 26. Accordingly, the brake unit 220A indirectly stops the rotation of the planetary gear carrier shaft 27 which is the variable-speed input shaft Av.

The brake control unit 230A is configured as a part of the main control device 120. The brake control unit 230A is different from the first embodiment in the reference value used for determination. The reference value of the brake control unit 230A of the second embodiment is a value greater than the temperature allowable by the variable-speed rotor bearing 85o when the variable-speed rotor 72 rotates at the rated rotation and is a value that corresponds to the temperature at which the variable-speed rotor bearing 85o can be regarded as being heated by the overspeed.

According to the variable-speed speed-up mechanism 1A of the second embodiment, the temperature of the variable-speed rotor bearing 85o which supports the variable-speed rotor 72 is detected by the detection unit 210A, and the operation unit 123 determines whether or not the detection result exceeds the reference value. Accordingly, it is possible to monitor whether or not the temperature of the variable-speed rotor bearing 85o is extremely high. Therefore, in a case where the abnormality, such as an increase in temperature of the variable-speed rotor bearing 85o, is generated in the variable-speed rotor 72, it is possible to more effectively suppress the overspeed.

Third Embodiment

Next, with reference to FIG. 6, a variable-speed speed-up mechanism 1B of a third embodiment will be described.

In the third embodiment, the same configuration elements as those of the first and second embodiments are denoted by the same reference numerals, and the detailed description thereof will be omitted. The variable-speed speed-up mechanism 1B according to the third embodiment is different from the first and second embodiments in the configurations of a detection unit 210B and a brake unit 220B.

Figure 6:
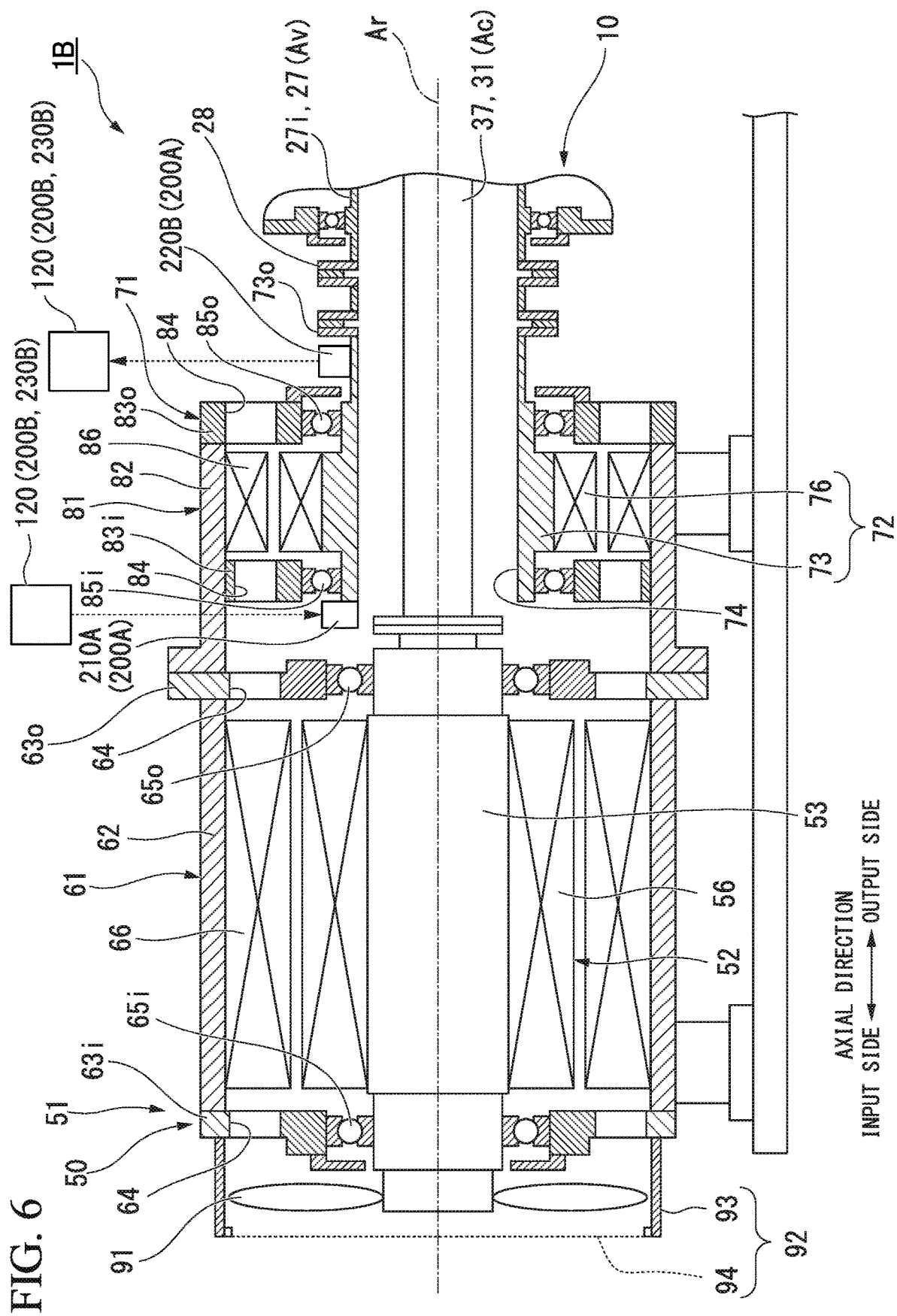
FIG. 6 is a sectional view of an electric device of a third embodiment according to the present invention.

In other words, in the variable-speed speed-up mechanism 1B of the third embodiment, as shown in FIG. 6, the configuration of a brake mechanism 200B is partially different from that of the first and second embodiments. The brake mechanism 200B of the third embodiment detects an abnormal state of the variable-speed electric motor 71, directly stops the rotation of the variable-speed rotor 72, and continues the rotation of the constant-speed rotor 52. In other words, the brake mechanism 200B stops only the variable-speed rotor 72 without hindering the rotation of the constant-speed rotor 52. The brake mechanism 200B of the third embodiment includes the detection unit 210B, the brake unit 220B, and a brake control unit 230B.

The detection unit 210B of the third embodiment is provided in the variable-speed rotor 72. The detection unit 210B detects the vibration frequency of the variable-speed rotor 72. The detection unit 210B sends the detection information on the vibration frequency of the variable-speed rotor 72 which is the detection result, to the brake control unit 230B.

The brake unit 220B of the third embodiment stops the rotation of the variable-speed rotor 72. The brake portion 220B is provided at the end portion on the input side in the axial direction of the variable-speed rotor 72 on the inside of the variable-speed electric motor 71. The brake unit 220B directly stops the rotation of the variable-speed rotor 72 itself.

The brake control unit 230B is configured as a part of the main control device 120. The brake control unit 230B is different from the first and second embodiments in the reference value used for determination. The reference value of the brake control unit 230B of the third embodiment is a value greater than the vibration frequency allowable by the variable-speed rotor 72 when the variable-speed rotor 72 rotates at the rated rotation and is a value that corresponds to the vibration frequency at which the variable-speed rotor bearing 85o can be regarded as being largely vibrated by the overspeed.

According to the variable-speed speed-up mechanism 1B of the third embodiment, the vibration frequency of the variable-speed rotor 72 is detected by the detection unit 210B, and the operation unit 123 determines whether or not the detection result exceeds the reference value. Accordingly, it is possible to monitor whether or not the variable-speed rotor 72 largely vibrates. Therefore, in a case where the abnormality, such as a large vibration of the variable-speed rotor 72, is generated in the variable-speed rotor 72, it is possible to more effectively suppress the overspeed.

Fourth Embodiment

Next, with reference to FIG. 7, a variable-speed speed-up mechanism 1C of a fourth embodiment will be described.

In the fourth embodiment, the same configuration elements as those of the first to third embodiments are denoted by the same reference numerals, and the detailed description thereof will be omitted. The variable-speed speed-up mechanism 1C according to the fourth embodiment is different from the first embodiment in the configuration of a detection unit 210C.

Figure 7:
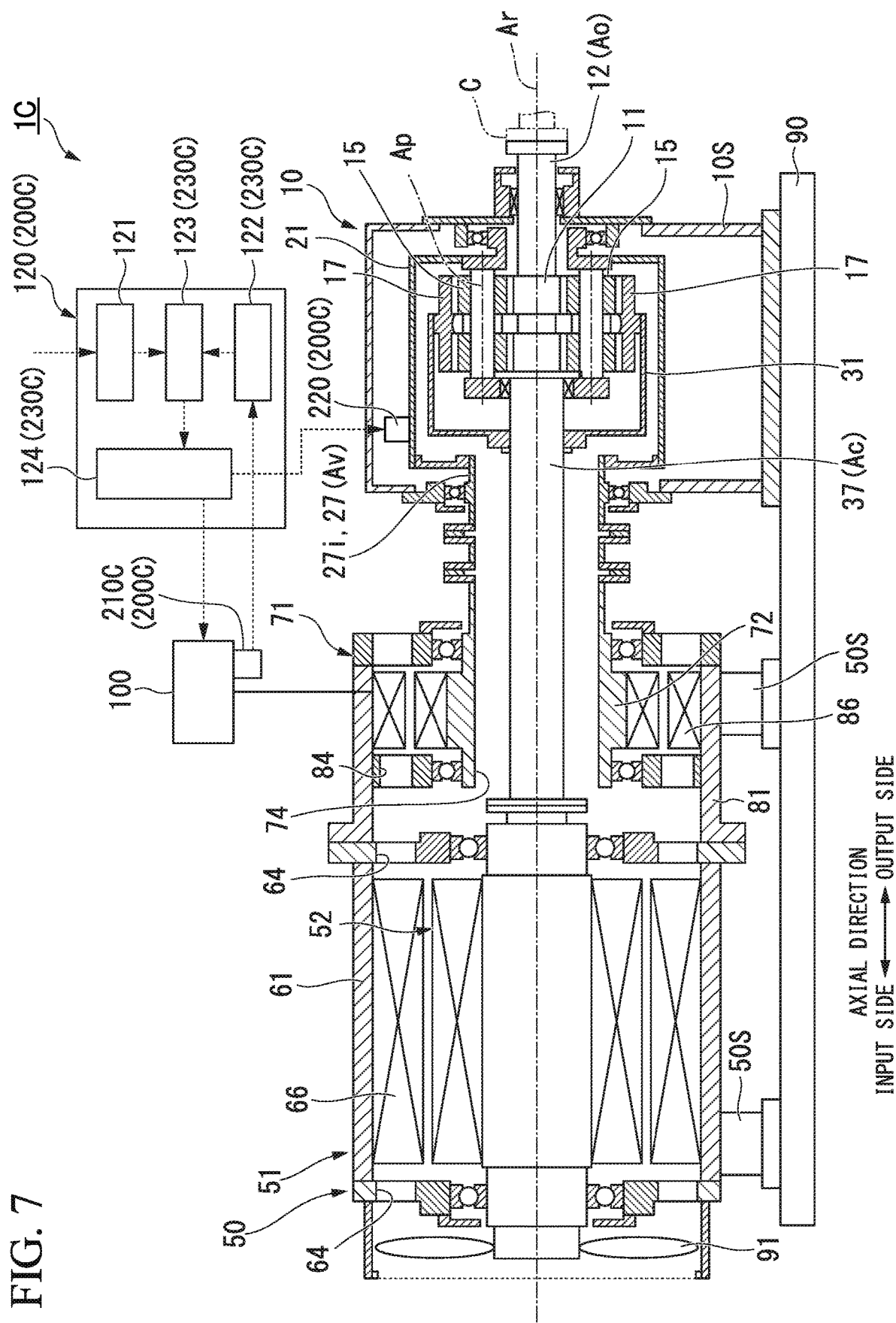
FIG. 7 is a sectional view of a variable-speed speed-up mechanism according to a fourth embodiment of the present invention.

In other words, in the variable-speed speed-up mechanism 1C of the fourth embodiment, as shown in FIG. 7, the configuration of a brake mechanism 200C is partially different from that of the first to third embodiments. The brake mechanism 200C of the fourth embodiment indirectly detects an abnormal state of the variable-speed electric motor 71, stops the rotation of the variable-speed input shaft Av, and continues the rotation of the constant-speed rotor 52. In other words, the brake mechanism 200C stops only the variable-speed input shaft Av without hindering the rotation of the constant-speed rotor 52. The brake mechanism 200C of the fourth embodiment includes the detection unit 210C, a brake unit 220C, and a brake control unit 230C.

The detection unit 210C of the fourth embodiment is provided in the rotational speed control device 100. The detection unit 210C detects the state of the rotational speed control device 100. In other words, the detection unit 210C indirectly monitors the change in state of the variable-speed rotor 72 according to the change in state of the rotational speed control device 100 by detecting the state of the rotational speed control device 100. The detection unit 210C sends the detection information on the state of the rotational speed control device 100 which is the detection result, to the brake control unit 230C.

The brake unit 220C of the fourth embodiment stops the rotation of the variable-speed input shaft Av. The brake unit 220C has the same configuration as that of the first embodiment. The brake control unit 230C is configured as a part of the main control device 120. The brake control unit 230C is different from the first to third embodiments in the reference value used for determination. The reference value of the brake control unit 230C of the fourth embodiment is a value that can be regarded as a failure of the rotational speed control device 100.

According to the variable-speed speed-up mechanism 1C of the fourth embodiment, the state of the rotational speed control device 100 is detected by the detection unit 210C, and the operation unit 123 determines whether or not the detection result exceeds the reference value. Accordingly, it is possible to monitor whether or not abnormality, such as a failure in the rotational speed control device 100, is generated. Therefore, in a case where the abnormality is generated in the variable-speed rotor 72 by the failure of the rotational speed control device 100, it is possible to more effectively suppress the overspeed.

Above, although the embodiments of the present invention have been described in detail with reference to the drawings, each of the configurations and combinations thereof in each of the embodiments are merely examples, and additions, omissions, substitutions, and other changes of configurations are possible within the scope not departing from the gist of the present invention. Further, the present invention is not limited by the embodiments, but is limited only by the claims.

In the above-described embodiment, a four-pole three-phase induction electric motor is exemplified as the constant-speed electric motor 51 suitable for rotating the compressor C at high speed, and a six-pole three-phase induction electric motor is exemplified as the variable-speed electric motor 71 suitable for variably changing the rotational speed of the compressor C within a certain range. However, in a case where it is unnecessary to rotate the target to be driven at high speed, other types of electric motors may be used as the constant-speed electric motor 51 or the variable-speed electric motor 71.

In addition, in the above-described embodiment, the shaft insertion hole 74 is formed in the variable-speed rotor 72 and the constant-speed rotor 52 is inserted into the shaft insertion hole 74, but the shaft insertion hole 74 may be formed in the constant-speed rotor 52 and the variable-speed rotor 72 may be inserted into the shaft insertion hole 74.

In addition, in the above-described embodiment, the constant-speed rotor 52, the variable-speed rotor 72, and the sun gear shaft 12 are arranged on the same axis Ar, but the invention is not limited thereto. For example, the variable-speed electric motor 71 may be disposed such that the axis Ar of the variable-speed rotor 72 is parallel to the axis Ar of the constant-speed rotor 52 and is at a different position.

In addition, the brake units 220, 220A, 220B, and 220C of the present embodiment stop any one of the rotation of the internal gear carrier shaft 37 which is the variable-speed input shaft Av and the variable-speed rotor 72, but the invention is not limited to the configuration. For example, the brake units 220, 220A, 220B, and 220C may be have a structure in which both the variable-speed input shaft Av and the variable-speed rotor 72 are directly stopped.

In addition, the brake control units 230, 230A, 230B, and 230C according to the present embodiment are configured as a part of the main control unit 120, but the invention is not limited to the configuration. For example, the brake control units 230, 230A, 230B, and 230C may be integrally configured with the detection unit 210C.

In addition, the state of the variable-speed electric motor 71 detected by the detection units 210, 210A, 210B, and 210C is not limited to the above-described embodiment, and may be information that can be used when detecting the abnormal state of the variable-speed electric motor 71. For example, the detection unit may detect the state of power supply to the variable-speed speed-up mechanism 1. In this case, in a case where a power failure occurs and the supply of electric power to the variable-speed speed-up mechanism 1 is stopped, the brake control unit may send the instruction to the brake unit regarding the variable-speed electric motor 71 to be in an abnormal state.

INDUSTRIAL APPLICABILITY

According to the above-described variable-speed speed-up mechanism, it is possible to prevent the rotational speed of the variable-speed rotor 72 from becoming greater than the rated rotational speed.

REFERENCE SIGNS LIST 1, 1A, 1B, 1C VARIABLE-SPEED SPEED-UP MECHANISM
10 TRANSMISSION DEVICE
Ar AXIS
11 SUN GEAR
12 SUN GEAR AXIS
Ao OUTPUT SHAFT
13 CONNECTION FLANGE
Ap CENTER LINE
15 PLANETARY GEAR
17 INTERNAL GEAR
21 PLANETARY GEAR CARRIER
22 PLANETARY GEAR SHAFT
23 PLANETARY GEAR CARRIER BODY
24 PLANETARY GEAR OUTPUT SIDE ARM PORTION
25 PLANETARY GEAR CYLINDER PORTION
26 PLANETARY GEAR INPUT SIDE ARM PORTION
27 PLANETARY GEAR CARRIER SHAFT
27o OUTPUT SIDE PLANETARY GEAR CARRIER SHAFT
27i INPUT SIDE PLANETARY GEAR CARRIER SHAFT
Av VARIABLE-SPEED INPUT SHAFT
28 PLANETARY GEAR FLANGE
31 INTERNAL GEAR CARRIER
33 INTERNAL GEAR CARRIER BODY
35 INTERNAL GEAR CYLINDER PORTION
36 INTERNAL GEAR INPUT SIDE ARM PORTION
37 INTERNAL GEAR CARRIER SHAFT
Ac CONSTANT-SPEED INPUT SHAFT
41 TRANSMISSION CASING
42 SUN GEAR BEARING
43 FIRST PLANETARY GEAR CARRIER BEARING
44 SECOND PLANETARY GEAR CARRIER BEARING
45 CASING FLANGE
50 ELECTRIC DEVICE
51 CONSTANT-SPEED ELECTRIC MOTOR
52 CONSTANT-SPEED ROTOR
53 CONSTANT-SPEED ROTOR SHAFT
56 CONDUCTOR
66 CONSTANT-SPEED STATOR
61 CONSTANT-SPEED ELECTRIC MOTOR CASING
62 CONSTANT-SPEED CASING BODY
63i, 63o LID
64 OPENING
65i, 65o CONSTANT-SPEED ROTOR BEARING
71 VARIABLE-SPEED ELECTRIC MOTOR
72 VARIABLE-SPEED ROTOR
73 VARIABLE-SPEED ROTOR SHAFT
74 SHAFT INSERTION HOLE
73o VARIABLE-SPEED FLANGE
76 CONDUCTOR
86 VARIABLE-SPEED STATOR
81 VARIABLE-SPEED ELECTRIC MOTOR CASING
82 TRANSMISSION CASING BODY
83o OUTPUT SHAFT LID
83i INLET SIDE LID
84 OPENING
85i, 85o VARIABLE-SPEED ROTOR BEARING
91 COOLING FAN
92 FAN COVER
93 COVER BODY
94 AIR CIRCULATING PLATE
100 ROTATIONAL SPEED CONTROL DEVICE
10S TRANSMISSION DEVICE INSTRUCTION UNIT
50S ELECTRIC DEVICE SUPPORT UNIT
90 FRAME
C COMPRESSOR
200, 200A, 200B, 200C BRAKE MECHANISM
210, 210A, 210B, 210C DETECTION UNIT
220, 220A, 220 B, 220C BRAKE UNIT
230, 230, 230B, 230C BRAKE CONTROL UNIT
120 MAIN CONTROL DEVICE
121 FIRST RECEPTION UNIT
122 SECOND RECEPTION UNIT
123 OPERATION UNIT
124 INTERFACE

What is claimed is:

1. A variable-speed speed-up mechanism comprising:
an electric device which is configured to generate a rotational driving force; and
a transmission device which is configured to change the rotational driving force generated by the electric device and to transmit the rotational driving force to a target to be driven,
wherein the transmission device includes
   a sun gear which is configured to rotate around an axis line,
   a sun gear shaft which is fixed to the sun gear and extends in a axial direction around the axis line,
   a planetary gear which is configured to mesh with the sun gear and to revolve around the axis line and to rotate around a center line thereof,
   an internal gear of which a plurality of teeth are arranged in an annular shape around the axis line, and which is configured to mesh with the planetary gear,
   a planetary gear carrier which has a planetary gear carrier shaft that extends in the axial direction around the axis line and supports the planetary gear to be capable of revolving around the axis line and to be rotatable around the center line of the planetary gear, and
   an internal gear carrier which has an internal gear carrier shaft that extends in the axial direction around the axis line and supports the internal gear to be rotatable around the axis line,
wherein the sun gear shaft forms an output shaft which is configured to connect to the target to be driven, the internal gear carrier shaft forms a constant-speed input shaft, and the planetary gear carrier shaft forms a variable-speed input shaft,
wherein the electric device includes
   a constant-speed electric motor having a constant-speed rotor that is configured to rotate the constant-speed input shaft of the transmission device in a first direction, and
   a variable-speed electric motor having a variable-speed rotor which is connected to the variable-speed input shaft of the transmission device, which is formed in a cylindrical shape around the axis line, and in which the constant-speed input shaft is inserted into a shaft insertion hole penetrating in the axial direction, and
wherein a brake mechanism which is configured to detect an abnormal state of the variable-speed electric motor, stop rotation of at least one of the variable-speed input shaft and the variable-speed rotor, and continue the rotation of the constant-speed rotor, is further provided.

2. The variable-speed speed-up mechanism according to claim 1,
wherein the brake mechanism includes
   a detection unit which is configured to detect a state of the variable-speed electric motor,
   a brake unit which is configured to stop the rotation of at least one of the variable-speed input shaft and the variable-speed rotor, and
   a brake control unit which is configured to send an instruction to stop the rotation of at least one of the variable-speed input shaft and the variable-speed rotor to the brake unit in a case where a detection result of the detection unit is regarded to be in an abnormal state.

3. The variable-speed speed-up mechanism according to claim 2,
wherein the detection unit is configured to measure a rotational speed of the variable-speed rotor, and
wherein the brake control unit is configured to regard the detection result to be in the abnormal state in a case where the rotational speed measured by the detection unit exceeds a reference value, and send an instruction to the brake unit.

4. The variable-speed speed-up mechanism according to claim 2,
wherein the detection unit is configured to measure a temperature of a bearing which supports the variable-speed rotor, and
wherein the brake control unit is configured to regard the detection result to be in the abnormal state in a case where the temperature measured by the detection unit exceeds a reference value, and send an instruction to the brake unit.

5. The variable-speed speed-up mechanism according to claim 2,
wherein the detection unit is configured to measure a vibration frequency of the variable-speed rotor, and
wherein the brake control unit is configured to regard the detection result to be in the abnormal state in a case where the vibration frequency measured by the detection unit exceeds a reference value, and send an instruction to the brake unit.

6. The variable-speed speed-up mechanism according to claim 2,
wherein the detection unit is configured to detect a state of a rotational speed control device which controls the rotational speed of the variable-speed rotor, and
wherein the brake control unit is configured to regard the state of the rotational speed control device detected by the detection unit as the abnormal state in a case where the rotational speed control device is regarded to be failed, and send the instruction to the brake unit.

* * * * *